US012809642B2

(12) United States Patent
Chen et al.

(10) Patent No.: US 12,809,642 B2
(45) Date of Patent: Nov. 24, 2026

(54) APPLICATION STARTING METHOD, ELECTRONIC DEVICE, AND READABLE STORAGE MEDIUM

(71) Applicant: GUANGDONG OPPO MOBILE TELECOMMUNICATIONS CORP., LTD., Dongguan (CN)

(72) Inventors: Long Chen, Dongguan (CN); Zhaojin Wang, Dongguan (CN); Yanan Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 235 days.

(21) Appl. No.: 18/870,628

(22) PCT Filed: Nov. 30, 2022

(86) PCT No.: PCT/CN2022/135461
§ 371 (c)(1),
(2) Date: Nov. 29, 2024

(87) PCT Pub. No.: WO2023/134317
PCT Pub. Date: Jul. 20, 2023

(65) Prior Publication Data

US 2025/0328356 A1 Oct. 23, 2025

(30) Foreign Application Priority Data

Jan. 13, 2022 (CN) ......................... 202210039195.5

(51) Int. Cl.
*G06F 9/44* (2018.01)
*G06F 9/4401* (2018.01)
*G06F 9/445* (2018.01)

(52) U.S. Cl.
CPC .......... *G06F 9/44505* (2013.01); *G06F 9/441* (2013.01)

(58) Field of Classification Search
CPC ............................... G06F 9/4405; G06F 9/441
See application file for complete search history.

(56) References Cited

U.S. PATENT DOCUMENTS

2012/0110496 A1* 5/2012 Lee .................. H04M 1/72403 715/778
2012/0192100 A1* 7/2012 Wang .................... G06F 3/1454 715/781

(Continued)

FOREIGN PATENT DOCUMENTS

CN 104182275 A 12/2014
CN 106919313 A 7/2017

(Continued)

OTHER PUBLICATIONS

International Search Report in International Application No. PCT/CN2022/135461, mailed on Feb. 9, 2023.

(Continued)

*Primary Examiner* — Stefan Stoynov
(74) *Attorney, Agent, or Firm* — Ladas & Parry, LLP

(57) ABSTRACT

Disclosed are an application starting method, an electronic device and a readable storage medium. The method-includes: in a case that a display screen of the electronic device is controlled by a first operating system, and in response to a second operating system detecting that a pre-starting condition is met, pre-starting one or more first applications in the second operating system by the second operating system; and, in response to a first system switching instruction, switching to a case that the display screen is controlled by the second operating system, and controlling the display screen by the second operating system to display an inter- (Continued)

face related to a target application in the pre-started first application.

20 Claims, 4 Drawing Sheets

(56) References Cited

U.S. PATENT DOCUMENTS

| | | | | |
|---|---|---|---|---|
| 2013/0125126 | A1 | 5/2013 | Yokota et al. | |
| 2016/0055031 | A1* | 2/2016 | Tu | G06F 9/441 718/108 |

FOREIGN PATENT DOCUMENTS

| | | | |
|---|---|---|---|
| CN | 107102891 | A | 8/2017 |
| CN | 109062924 | A | 12/2018 |
| CN | 110262849 | A | 9/2019 |
| CN | 111095205 | A | 5/2020 |
| CN | 111104153 | A | 5/2020 |
| CN | 112987907 | A | 6/2021 |

OTHER PUBLICATIONS

Written Opinion of the International Searching Authority in International Application No. PCT/CN2022/135461, mailed on Feb. 9, 2023.

International Preliminary Report on Patentability in International Application No. PCT/CN2022/135461, mailed on Jun. 20, 2024.

Chinese First Office Action, corresponding Chinese Application No. 202210039195.5, mailed Jun. 18, 2026 with search report (18 pages).

* cited by examiner

APPLICATION STARTING METHOD, ELECTRONIC DEVICE, AND READABLE STORAGE MEDIUM

CROSS REFERENCE TO RELATED APPLICATIONS

The present application is 35 U.S.C. 371 National Phase application of International Patent Application No. PCT/CN2022/135461, filed Nov. 30, 2022, which claims priority to Chinese Patent Application No. 202210039195.5, filed Jan. 13, 2022, both of which are herein incorporated by reference in their entireties.

TECHNICAL FIELD

The present disclosure relates to the field of electronic devices, and in particular to an application starting method, an electronic device and a readable storage medium.

BACKGROUND

Among existing devices, some of them use dual operating systems for collaborative work. However, such devices often need to go through a long period of preparation when starting an application, resulting in an excessively long time for starting the application.

SUMMARY

In a first aspect, embodiments of the present disclosure provide an application starting method. The application starting method is applicable to an electronic device capable of running a first operating system and a second operating system, and includes: in a case that a display screen of the electronic device is controlled by the first operating system, and in response to the second operating system detecting that a pre-starting condition is met, pre-starting one or more first applications in the second operating system by the second operating system; and, in response to a first system switching instruction, switching to a case that the display screen is controlled by the second operating system, and controlling the display screen by the second operating system to display an interface related to a target application in the pre-started first application.

In a second aspect, the embodiments of the present disclosure provide an electronic device, which may include: a memory storing executable program codes; and, a processor and a display screen both coupled to the memory. The processor is configured to invoke the executable program codes stored in the memory. In response to the executable program codes being executed by the processor, the processor and the display screen perform the method described in the first aspect.

In a third aspect, the embodiments of the present disclosure provide a non-transitory computer-readable storage medium, which stores a computer program. In response to the computer program being executed by a processor, the processor is enabled to perform the method described in the first aspect.

Details of one or more embodiments of the present disclosure are set forth in accompanying drawings and description below. Other features and beneficial effects of the present disclosure will appear from the description, drawings and claims.

BRIEF DESCRIPTION OF THE DRAWINGS

In order to more clearly illustrate technical solutions of embodiments of the present disclosure, the following will briefly introduce the accompanying drawings that are used in the description of the embodiments and related art. Obviously, the accompanying drawings in the following description are only some embodiments of the present disclosure, and other drawings may also be obtained from these accompanying drawings.

DETAILED DESCRIPTION

Figure 1:
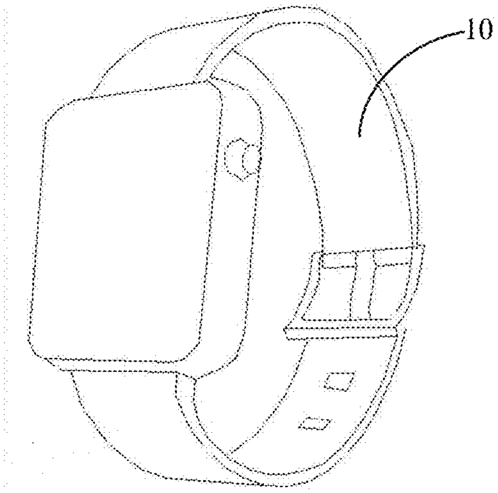
FIG. 1 is a schematic scene diagram of an application starting method disclosed in some embodiments of the present disclosure.

Embodiments of the present disclosure provide an application starting method, an application starting device, an electronic device, and a readable storage medium, which are used to improve starting efficiency of an application during dual-system cooperation.

In order to enable those skilled in the art to better understand technical solutions of the present disclosure, the technical solutions in the embodiments of the present disclosure will be described below in conjunction with the accompanying drawings in the embodiments of the present disclosure. Obviously, the described embodiments are only a part of the embodiments of the present disclosure, and not all embodiments. All embodiments based on the present disclosure should belong to protection scope of the present disclosure.

It may be understood that, the electronic device involved in the embodiments of the present disclosure may include a general handheld electronic device with screen, such as a mobile phone, a smart phone, a portable terminal, a terminal, a personal digital assistant (PDA), a personal multimedia player (PMP) device, a notebook computer, a note pad, a wireless broadband (Wibro) terminal, a personal computer (PC), a smart PC, a point of sales (POS), and on-board computer, etc.

The electronic device may also include a wearable device. The wearable device is a portable electronic device that may be worn directly on a user, or may be integrated into the user's clothing or accessory. The wearable device is not only a hardware device, but also may realize powerful intelligent functions through software support, data interaction, and cloud server interaction, such as a calculation function, a positioning function, an alarm function. The wearable device may also be connected to mobile phones and various terminals. The wearable device may include, but are not limited to, a wrist-supported watch (such as a watch, a wrist, etc.), a feet-supported shoe (such as a shoe, a sock, or other leg-wearing products), head-supported glasses (such as glasses, a helmet, a headband, etc.), and a smart clothing, a school bag, a crutch, an accessory, and other non-mainstream product forms.

The electronic device disclosed in the embodiments of the present disclosure may have two processors, one processor runs a first operating system, and the other processor runs a second operating system. Alternatively, the electronic device may have a dual-core processor, one core runs the first operating system, and the other core runs the second operating system. The first operating system may be a low-power operating system installed on a microcontroller unit (MCU), such as a real-time operating system (RTOS). The second operating system may be a relatively high-power and high-performance operating system, and the second operating system may include any of the following systems: a Symbian operating system (OS), an iPhone operating system (IOS), a blackberry operating system, and an android operating system.

In an existing dual-system device, if an application is to be started, it is often necessary to first wake up the operating system running the application, and then start pre-preparation work of the application through the operating system, which takes a long time.

As illustrated in FIG. 1, which is a schematic scene diagram of an application starting method disclosed in some embodiments of the present disclosure. The scene diagram shown in FIG. 1 may include an electronic device 10, which is a smart watch. The electronic device 10 may pre-start one or more applications in the second operating system by the second operating system according to a pre-starting condition. In this way, when responding to a system switching instruction, the second operating system does not need to spend a long time for starting the application, and an interface related to the pre-started application may be quickly displayed on a display screen. It may be seen that, compared with the solution in related art, the present method may improve starting efficiency of the application.

Figure 2A:
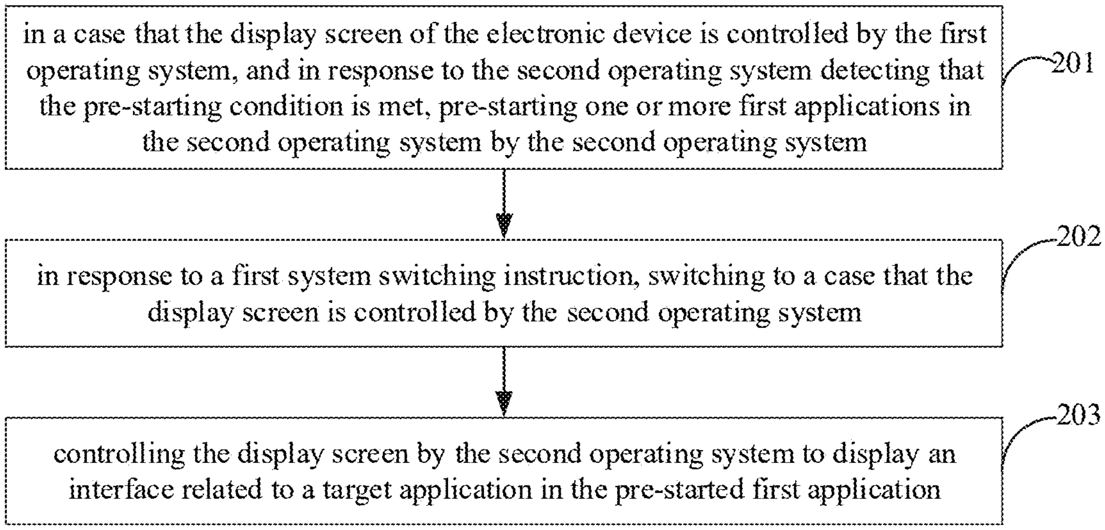
FIG. 2A is a schematic flowchart of an application starting method disclosed in some embodiments of the present disclosure.

As illustrated in FIG. 2A, which is a schematic flowchart of an application starting method disclosed in some embodiments of the present disclosure. The application starting method shown in FIG. 2A may include the following operations.

At block 201, the method may include: in a case that the display screen of the electronic device is controlled by the first operating system, and in response to the second operating system detecting that the pre-starting condition is met, pre-starting one or more first applications in the second operating system by the second operating system.

In some embodiments of the present disclosure, a peripheral of the electronic device (such as a speaker, a pickup, a camera, and a display screen, etc.) may be controlled by switching between the first operating system and the second operating system.

In some embodiments, the pre-starting condition may be preset by the user, or may be learned from a usage record of the application on the electronic device, which is not limited in the embodiments of the present disclosure.

In some embodiments, the pre-starting condition may include a time condition and/or a scene condition. The time condition may refer to a time period or moment, and the scene condition may refer to at least one of the following: user information, location information, environment information, and an application running on the front-end of the electronic device. The user information may be used to identify the user using the electronic device, and the user information may include at least one of the following: user voiceprint information, user fingerprint information, user image information, and user iris information. The location information is used to reflect the user's location and may be obtained through a positioning module of the electronic device. The environmental information is used to reflect the user's surrounding environment and may be obtained by capturing environmental images through a camera of the electronic device. The application running in the front-end of the electronic device means that the interface related to the application is displayed on the display screen of the electronic device.

When the pre-starting condition is the user information, the pre-started application may be the application most frequently used by the user, such as WeChat, mailbox, and the like.

When the pre-starting condition is the environmental information which indicates that the user is currently at a subway entrance, a payment application may be pre-started. When the environmental information indicates that the user is at a pedestrian entrance of a garage, a car-finding application may be pre-started.

When the pre-starting condition is the location information which indicates that the current location is a home, a smart home management application may be pre-started. When the location information indicates that the current location is a movie theater, a setting application of the electronic device may be pre-started.

The following describes that the scene condition refers to an application running in the front-end of the electronic device. The electronic device may associate an application A with an application B, and use the application A running in the front-end of the electronic device as a condition for starting the application B, that is, when it is detected that the application A is running in the front-end of the electronic device, it is determined that a pre-starting condition of the application B is met. In some embodiments, if the application A is a music application, and the application B is a Bluetooth connection application, the Bluetooth connection application is pre-started when the music application is started. In this way, when the user needs to start the Bluetooth connection application, the Bluetooth connection application will be started immediately, which is convenient for the user to quickly connect Bluetooth headsets, Bluetooth speakers, or the like. If the application A is a sport application and the application B is a map application, the map application is pre-started when the sport application is started. In this way, when the user needs to start the map application, the map application will be started immediately, which is convenient for the user to quickly plan exercise routes, exercise time period, etc.

In some embodiments of the present disclosure, there are one or more pre-starting conditions, and each pre-starting condition may correspond to one or more applications that need to be pre-started in the second operating system, and the one or more applications that need to be pre-started may be preset by the user, or may be learned from the usage record of the application so as to conform to the user's habitual characteristics of using the application.

In some embodiments, detecting whether the pre-starting condition is met by the second operating system may include: detecting whether the current moment meets the time condition by the first operating system; and/or detecting whether the scene information (at least one of the user information, the location information, the environment information, and the application running in the front-end of the electronic device) at the current moment meets the scene condition by the second operating system.

In some embodiments, one or more first applications in the second operating system may be pre-started by the second operating system, so that the one or more first applications may run in the background of the electronic device.

In some embodiments, pre-starting the one or more first applications in the second operating system by the second operating system refers to performing at least one or more operations of process creation, initialization, and interface creation for each first application. The process creation, the initialization, and the interface creation must be executed sequentially.

In some embodiments, a specific manner of pre-starting each first application by the second operating system may be performed according to a preset starting policy matching the pre-starting condition, and the starting policy refers to a step of pre-starting the first application. Based on this, in some embodiments, if the second operating system detects that the pre-starting condition is met, the pre-starting the one or more first applications in the second operating system by the second operating system may include: when the second operating system detects that the pre-starting condition is met, the second operating system acquires the starting policy that matches the pre-starting condition, and the one or more first applications in the second operating system are pre-started according to the starting policy that matches the pre-starting condition. The starting policy of each pre-starting condition may be pre-set independently by the user according to own needs. By implementing this method, a flexibility of pre-starting the application may be further improved based on the setting of multiple starting policies.

At block 202, the method may include: in response to a first system switching instruction, switching to a case that the display screen is controlled by the second operating system.

The first system switching instruction may be generated according to an application starting operation or a screen-on operation for the target application, which is not limited in the embodiments of the present disclosure. Both the application starting operation and the screen-on operation may be detected by the first operating system, and the application starting operation and screen-on operation for the target application may include any of the following: a voice operation, a gesture operation, and a touch operation, etc. The target application is any one or more applications in the first applications.

The in response to a first system switching instruction, switching to a case that the display screen is controlled by the second operating system may include: if the first operating system detects the first system switching instruction, the first operating system sends a first instruction for instructing the second operating system to control the display screen to the second operating system, and when receiving the first instruction, the second operating system controls the display screen in response to the first instruction. If the first operating system and the second operating system are arranged on two different processors, there may be a communication interface between the two processors, through which the first operating system and the second operating system may communicate with each other.

At block 203, the method may include: controlling the display screen by the second operating system to display an interface related to a target application in the pre-started first application.

In some embodiments, the controlling the display screen by the second operating system to display an interface related to a target application in the pre-started first application may include: detecting by the second operating system whether the interface related to the target application running in the background has been created; if it has been created, the second operating system controls the display screen to display the interface related to the target application; if it has not been created, the second operating system creates the interface related to the target application and controls the display screen to display the interface related to the target application.

Figure 2B:
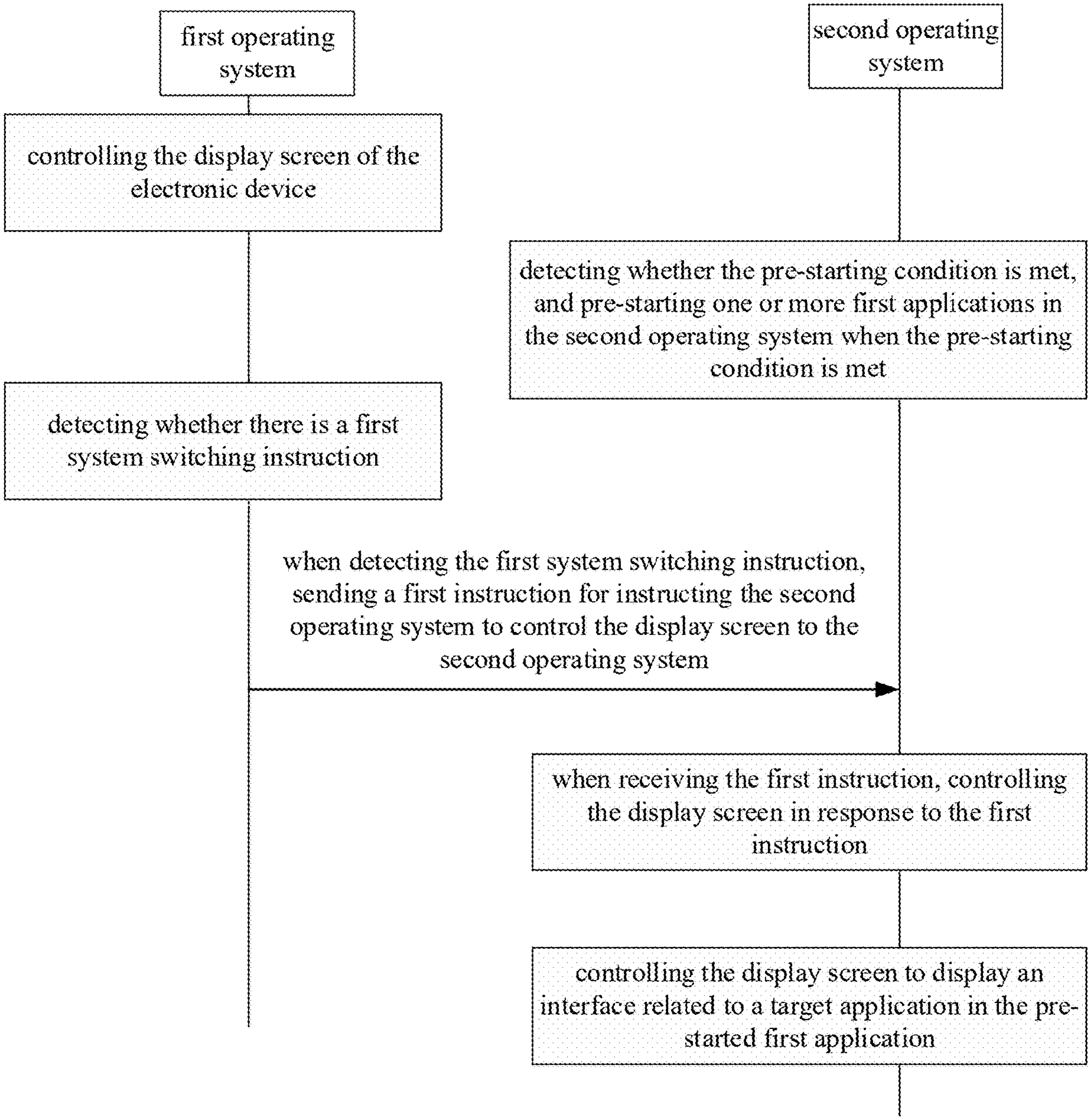
FIG. 2B is a schematic diagram of interaction between a first operating system and a second operating system disclosed in some embodiments of the present disclosure.

For a specific interaction between the first operating system and the second operating system, please refer to FIG. 2B.

By implementing the above method, the one or more applications in the second operating system may be pre-started by the second operating system according to the pre-starting condition. In this way, when a control right of the display screen is switched to the second operating system in response to the system switching instruction, the second operating system does not need to spend a long time to start the application, and the interface related to the pre-started application may be quickly displayed on the display screen, which greatly improves the starting efficiency of the application.

Figure 3:
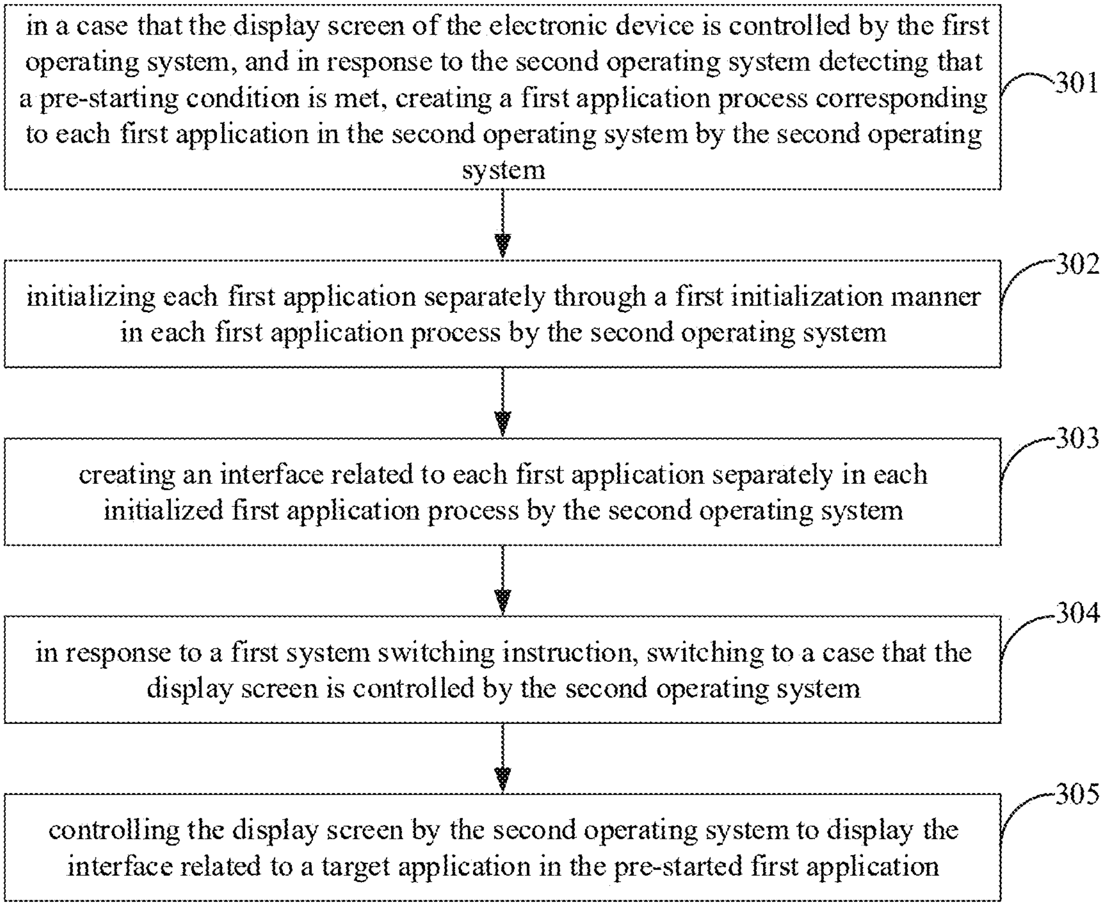
FIG. 3 is a schematic flowchart of another application starting method disclosed in some embodiments of the present disclosure.

As illustrated in FIG. 3, which is a schematic flowchart of another application starting method disclosed in some embodiments of the present disclosure. The application starting method illustrated in FIG. 3 may include the following operations.

At block 301, the method may include: in a case that the display screen of the electronic device is controlled by the first operating system, and in response to the second operating system detecting that a pre-starting condition is met, creating a first application process corresponding to each first application in the second operating system by the second operating system.

In some embodiments, if the pre-starting condition is learned according to the use record of the application on the electronic device, before the operation at block 301, the method further includes: in a case that the display screen of the electronic device is controlled by the first operating system, obtaining the pre-starting condition corresponding to the user by the second operating system and the one or more first applications to be started in the second operating system corresponding to the pre-starting condition.

In some embodiments, the pre-starting condition corresponding to the user and the one or more first applications to be started in the second operating system corresponding to the pre-starting condition may be pre-built by the second operating system based on the user's application usage record within a second specified time period. The second specified time period may be a longer time period such as one week, one month, one quarter or half a year. The application usage record may include, but are not limited to, the usage time, the usage location, and the usage environment, etc.

In some embodiments, the second operating system may perform deep learning according to a preset deep learning algorithm and the user's application usage record within the second specified time period, so as to obtain the pre-starting condition corresponding to the user and the one or more first applications to be started in the second operating system corresponding to the pre-starting condition. The preset deep learning algorithm may include any of the following: back-propagation, feedforward neural network, convolutional neural network, and cyclic neural network.

In some embodiments, the obtaining the pre-starting condition corresponding to the user by the second operating system and the one or more first applications to be started in the second operating system corresponding to the pre-starting condition may include: obtaining user identity information by the second operating system, and obtaining the pre-starting condition corresponding to the user and the one or more first applications to be started in the second operating system corresponding to the pre-starting condition based on the user identity information.

The electronic device may be pre-constructed with pre-starting conditions respectively corresponding to multiple users, and one or more first applications to be started in the second operating system corresponding to the pre-starting conditions. The pre-starting condition corresponding to each user and the one or more first applications to be started in the second operating system corresponding to the pre-starting condition are respectively stored in association with the user identity information of the user. The user identity information may include at least one of the following: user voiceprint information, user fingerprint information, user iris information, and user image information. By implementing the method, the electronic device may realize personalized application management for multiple users, which greatly improves the intelligence of the electronic device.

In some embodiments, the creating the first application process corresponding to each first application in the second operating system by the second operating system may include: detecting by the second operating system whether the first application process corresponding to each first application to be started in the second operating system has been created; and, in response to the first application process corresponding to any first application being not created, creating the first application process corresponding to the any first application by the second operating system.

At block 302, the method may include: initializing each first application separately through a first initialization manner in each first application process by the second operating system.

In some embodiments, the initializing each first application separately through a first initialization manner in each first application process by the second operating system may include: respectively invoking the first initialization manner in each first application process to load a third-party library corresponding to each first application process. In a case that the second operating system is an Android operating system, the first initialization manner may be BindApplication( ).

In some embodiments, the initializing each first application separately through the first initialization manner in each first application process by the second operating system may include: detecting by the second operating system whether each first application process created in the second operating system has been initialized; if any first application process has not been initialized, initializing the any first application process by the second operating system.

At block 303, the method may include: creating an interface related to each first application separately in each initialized first application process by the second operating system.

In some embodiments, the creating the interface related to each first application separately in each initialized first application process by the second operating system may include: creating a corresponding application component separately in each initialized first application process by the second operating system, and initializing a property of each application component through a second initialization manner to obtain the interface related to each first application. The property may include, but not limited to, unique representation, style class, inline style, whether to display, and event, etc. In a case that the second operating system is the Android operating system, the second initialization manner may be OnCreate( ).

At block 304, the method may include: in response to a first system switching instruction, switching to a case that the display screen is controlled by the second operating system.

For the detailed description of the operation at block 304, please refer to the introduction of the operation at block 202 in the above-mentioned embodiments, and details are not repeated here.

At block 305, the method may include: controlling the display screen by the second operating system to display the interface related to a target application in the pre-started first application.

In some embodiments, the controlling the display screen by the second operating system to display the interface related to the target application in the pre-started first application may include: invoking the first display method by the second operating system to display a static element of the interface related to the target application in the pre-started first application on the display screen, and invoking the second display method to display a corresponding dynamic element on the interface related to the target application that displays the static element.

The user cannot interact with the related interface displayed by invoking the first display method, but the user may interact with the related interface displayed by invoking the second display method. In a case that the second operating system is the Android operating system, the first display method may be OnStart( ), and the second display method may be OnResume( ).

After the operation at block 305, the following operation may also be performed: in response to the second operating system not detecting the application starting operation for a second application within a first specified time period, closing the pre-started second application. The second application is an application other than the target application among the one or more first applications. The closing the pre-started second application refers to destroying the application process of the created second application. The first specified time period may be a preset short time period. In some embodiments, the first specified time period may be 10 s (seconds), 15 s, 20 s, 25 s, or 30 s, etc. By implementing the method, if the first application that has been started in the background has not been triggered to start by the user for a long time, the first application is closed, which is beneficial to reduce the power consumption of the electronic device. In some embodiments, after the car-finding application is pre-started, if no operation of starting the car-finding application by the user is detected within a certain time period, the car-finding application running in the background is closed.

In some embodiments, in a case that the second operating system detects that the pre-starting condition is met, after the pre-starting one or more first applications in the second operating system by the second operating system, the method further includes: in response to the first operating system detecting a start instruction for a third application in the second operating system, switching to a case that the display screen is controlled by the second operating system, and controlling the display screen by the second operating system to display an interface related to the third application, the third application is an application other than the first application in the second operating system; and, updating the pre-starting condition corresponding to the user and the one or more first applications to be started in the second operating system corresponding to the pre-starting condition by second operating system based on a usage record of the third application. By implementing the method, the corresponding pre-starting condition and the first application corresponding to the pre-starting condition may be updated in time according to the real-time application usage situation, which is beneficial to improve the effectiveness of the pre-starting condition.

The process of displaying the interface related to the third application on the display screen by the second operating system may include: creating a second application process corresponding to the third application by the second operating system, initializing the second application process, creating an interface related to the third application in the initialized second application process, and displaying the interface related to the third application on the display screen.

By implementing the method, the related interfaces of one or more applications in the second operating system may be obtained in advance by the second operating system according to the pre-starting condition. In this way, when the control right of the display screen is switched to the second operating system in response to the system switching instruction, the second operating system does not need to spend a long time to create the related interfaces of one or more applications, and the related interface of the pre-started application may be further quickly displayed on the display screen, which further improves the starting efficiency of the application.

Figure 4:
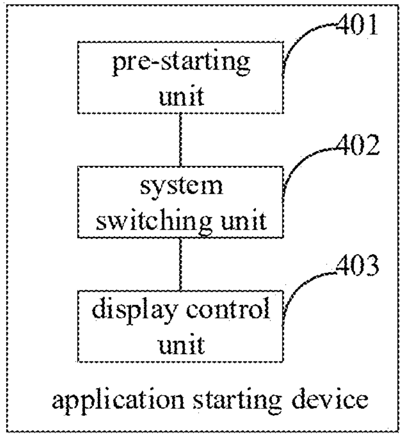
FIG. 4 is a structural block diagram of an application starting device disclosed in some embodiments of the present disclosure.

As illustrated in FIG. 4, which is a structural block diagram of an application starting device disclosed in some embodiments of the present disclosure. The application starting device illustrated in FIG. 4 may include: a pre-starting unit 401, a system switching unit 402, and a display control unit 403.

The pre-starting unit 401 is configured to: in a case that a display screen of the electronic device is controlled by a first operating system, and in response to a second operating system detecting that a pre-starting condition is met, pre-start one or more first applications in the second operating system by the second operating system.

The system switching unit 402 is configured to: in response to a first system switching instruction, switch to a case that the display screen is controlled by the second operating system.

The display control unit 403 is configured to: control the display screen by the second operating system to display an interface related to a target application in the pre-started first application.

In some embodiments, the manner in which the pre-starting unit 401 is configured to pre-start one or more first applications in the second operating system by the second operating system may include: the pre-starting unit 401 is configured to create a first application process corresponding to each first application in the second operating system by the second operating system, and initialize each first application separately through a first initialization manner.

In some embodiments, the pre-starting unit 401 is further configured to create an interface related to each first application separately in each initialized first application process by the second operating system through the first initialization manner after each first application is initialized.

In some embodiments, the manner in which the pre-starting unit 401 is configured to create the interface related to each first application separately in each initialized first application process may include: the pre-starting unit 401 is configured to create a corresponding application component separately in each initialized first application process by the second operating system, and initialize a property of each application component through a second initialization manner to obtain the interface related to each first application.

In some embodiments, the manner in which the pre-starting unit 401 is configured to create the first application process corresponding to each first application in the second operating system by the second operating system may include: the pre-starting unit 401 is configured to detect by the second operating system whether the first application process corresponding to each first application to be started in the second operating system has been created; and, in response to the first application process corresponding to any first application being not created, create the first application process corresponding to the any first application by the second operating system.

In some embodiments, the system switching unit 402 is further configured to: in response to the first operating system detecting an application starting operation for the target application in the second operating system, generate the first system switching instruction, before in response to the first system switching instruction, switching to a case that the display screen is controlled by the second operating system; or, in response to the first operating system detecting a screen-on operation, generate the first system switching instruction.

In some embodiments, the display control unit 403 is further configured to: in response to the second operating system not detecting the application starting operation for a second application within a first specified time period, close the pre-started second application, after the controlling the display screen by the second operating system to display an interface related to a target application in the pre-started first application. The second application is an application other than the target application among the one or more first applications.

Figure 5:
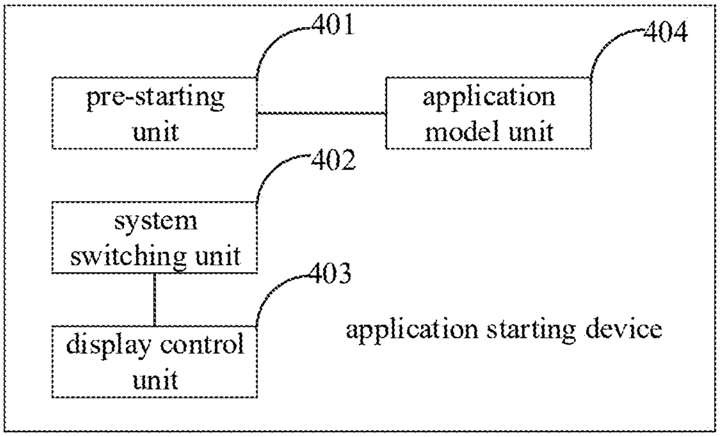
FIG. 5 is a structural block diagram of another application starting device disclosed in some embodiments of the present disclosure.

As illustrated in FIG. 5, which is a structural block diagram of another application starting device disclosed in some embodiments of the present disclosure. The application starting device illustrated in FIG. 5 is an optimization of the application starting device illustrated in FIG. 4. The application starting device illustrated in FIG. 5 may include the pre-starting unit 401, the system switching unit 402, the display control unit 403, and an application model unit 404.

For the description of the pre-starting unit 401, the system switching unit 402, and the display control unit 403, please refer to the above introduction, which will not be repeated here.

The application model unit 404 is configured to: in a case that the display screen of the electronic device is controlled by the first operating system, obtain the pre-starting condition corresponding to a user by the second operating system and one or more first applications to be started in the second operating system corresponding to the pre-starting condition, before the pre-starting unit 401 pre-starts one or more first applications in the second operating system by the second operating system in response to the second operating system detecting that a pre-starting condition is met. The pre-starting condition includes a time condition and/or a scene condition.

In some embodiments, the pre-starting condition corresponding to the user and the one or more first applications to be started in the second operating system corresponding to the pre-starting condition are pre-built by the second operating system based on the user's application usage record within the second specified time period.

In some embodiments, the manner in which the application model unit 404 is configured to obtain the pre-starting condition corresponding to the user by the second operating system and the one or more first applications to be started in the second operating system corresponding to the pre-starting condition may include: the application model unit 404 is configured to obtain user identity information by the second operating system, and obtain the pre-starting condition corresponding to the user and the one or more first applications to be started in the second operating system corresponding to the pre-starting condition based on the user identity information.

In some embodiments, the system switching unit 402 is further configured to: switch to a case that the display screen is controlled by the second operating system in response to the first operating system detecting the start instruction for the third application in the second operating system, after the pre-starting unit 401 pre-starts the one or more first applications in the second operating system by the second operating system.

Further, the display control unit 403 is also configured to: display an interface related to the third application on the display screen by the second operating system, the third application is an application other than the first application in the second operating system.

Still further, the application model unit 404 is also configured to: update the user's corresponding pre-starting condition and the one or more first applications to be started in the second operating system corresponding to the pre-starting condition by the second operating system based on the usage record of the third application.

Figure 6:
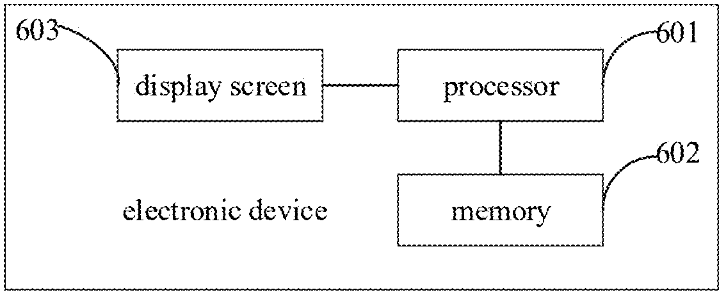
FIG. 6 is a structural block diagram of an electronic device disclosed in some embodiments of the present disclosure.

As illustrated in FIG. 6, which is a structural block diagram of an electronic device disclosed in some embodiments of the present disclosure. The electronic device illustrated in FIG. 6 may include a processor 601, a memory 602, and a display screen 603. The processor 601 and the display screen 603 are respectively coupled to the memory 602, and executable program codes may be stored in the memory 602.

The processor 601 may include one or more processing cores. The processor 601 uses various interfaces and lines to connect various parts of the entire electronic device. By running or executing instructions, programs, code sets or instruction sets stored in the memory 602, and invoking data stored in the memory 602, the processor 601 and the display screen 603 may respectively implement various functions and process data of the electronic device. In some embodiments, the processor 601 may be implemented in at least one hardware form of digital signal processing (DSP), field-programmable gate array (FPGA), and programmable logic array (PLA). The processor 601 may integrate one or a combination of a central processing unit (CPU), a graphics processing unit (GPU), a modem, and the like. The CPU mainly handles operating systems, user interfaces and applications, etc. The GPU is used to render and draw the displayed content. The modem is used to handle wireless communication. The above modem may also not be integrated into the processor 601, but implemented by a communication chip alone.

The memory 602 may include a random-access memory (RAM), and may also include a read-only memory (ROM). The memory 602 may be used to store instructions, programs, codes, code sets, or instruction sets. The memory 602 may include a program storage area and a data storage area, wherein the program storage area may store instructions for implementing an operating system, instructions for implementing at least one function (such as a touch function, a sound playback function, an image playback function, etc.), instructions for implementing the above-mentioned various method embodiments, and the like. The data storage area may also store data and the like created by the electronic device during use.

In some embodiments of the present disclosure, the processor 601 also has the following functions: in a case that a display screen of the electronic device is controlled by a first operating system, and in response to a second operating system detecting that a pre-starting condition is met, pre-starting one or more first applications in the second operating system by the second operating system; in response to a first system switching instruction, switching to a case that the display screen is controlled by the second operating system; and, controlling the display screen by the second operating system to display an interface related to a target application in the pre-started first application.

In some embodiments of the present disclosure, the processor 601 also has the following functions: creating a first application process corresponding to each first application in the second operating system by the second operating system, and initializing each first application separately through a first initialization manner.

In some embodiments of the present disclosure, the processor 601 also has the following functions: creating an interface related to each first application separately in each initialized first application process by the second operating system.

In some embodiments of the present disclosure, the processor 601 also has the following functions: creating a corresponding application component separately in each initialized first application process by the second operating system, and initializing a property of each application component through a second initialization manner to obtain the interface related to each first application.

In some embodiments of the present disclosure, the processor 601 also has the following functions: detecting by the second operating system whether the first application process corresponding to each first application to be started in the second operating system has been created; and, in response to the first application process corresponding to any first application being not created, creating the first application process corresponding to the any first application by the second operating system.

In some embodiments of the present disclosure, the processor 601 also has the following functions: in response to the first operating system detecting an application starting operation for the target application in the second operating system, generating the first system switching instruction; or, in response to the first operating system detecting a screen-on operation, generating the first system switching instruction.

In some embodiments of the present disclosure, the processor 601 also has the following functions: in response to the second operating system not detecting the application starting operation for a second application within a first specified time period, closing the pre-started second application. The second application is an application other than the target application among the one or more first applications.

In some embodiments of the present disclosure, the processor 601 also has the following functions: in a case that the display screen of the electronic device is controlled by the first operating system, obtaining the pre-starting condition corresponding to a user by the second operating system and one or more first applications to be started in the second operating system corresponding to the pre-starting condition; wherein the pre-starting condition includes a time condition and/or a scene condition.

In some embodiments of the present disclosure, the pre-starting condition corresponding to the user and the one or more first applications to be started in the second operating system corresponding to the pre-starting condition are pre-built by the second operating system based on a user's application usage record within a second specified time period.

In some embodiments of the present disclosure, the processor 601 also has the following functions: obtaining user identity information by the second operating system, and obtaining the pre-starting condition corresponding to the user and the one or more first applications to be started in the second operating system corresponding to the pre-starting condition based on the user identity information.

In some embodiments of the present disclosure, the processor 601 also has the following functions: in response to the first operating system detecting a start instruction for a third application in the second operating system, switching to a case that the display screen is controlled by the second operating system; controlling the display screen by the second operating system to display an interface related to the third application, wherein the third application is an application other than the first application in the second operating system; and, updating the pre-starting condition corresponding to the user and the one or more first applications to be started in the second operating system corresponding to the pre-starting condition by second operating system based on a usage record of the third application.

The embodiments of the present disclosure disclose a computer-readable storage medium, which stores a computer program. When the computer program is executed by a processor, the processor implements some or all of the operations performed by the electronic device in the above-mentioned embodiments.

The embodiments of the present disclosure disclose a computer program product. When the computer program product is run on a computer, the computer is enabled to perform some or all of the operations performed by the electronic device in the above embodiments.

The embodiments of the present disclosure disclose an application publishing platform. The application publishing platform is used to publish a computer program product. When the computer program product is run on a computer, the computer is enabled to some or all of the operations performed by the electronic device in the above embodiments.

In the above embodiments, all or part of them may be implemented by software, hardware, firmware or any combination thereof. When implemented using software, it may be implemented in whole or in part in the form of a computer program product.

The computer program product includes one or more computer instructions. When the computer program instructions are loaded and executed on the computer, the processes or functions according to the embodiments of the present disclosure will be generated in whole or in part. The computer may be a general-purpose computer, a special-purpose computer, a computer network, or other programmable devices. The computer instructions may be stored in a computer-readable storage medium, or transmitted from a computer-readable storage medium to another computer-readable storage medium. For example, the computer instructions may be transmitted from a website site, computer, server, or data center to another website site, computer, server, or data center by wired (e.g., coaxial cable, optical fiber, digital subscriber line (DSL)) or wireless (e.g., infrared, wireless, microwave, etc.). The computer-readable storage medium may be any available medium of a computer that may be used for storing, or may include a data storage device such as a server or a data center integrated with one or more available medium. The available medium may be a magnetic medium (e.g., floppy disk, magnetic disk, magnetic tape), an optical medium (e.g., DVD), or a semiconductor medium (e.g., solid state disk (SSD)), etc.

Those skilled in the art may clearly understand that, for the convenience and brevity of the description, the specific working process of the above-described system, device, and unit may refer to the corresponding process in the foregoing method embodiments, which will not be repeated here.

In some embodiments provided in the present disclosure, the disclosed system, device and method may be implemented in other ways. For example, the device embodiments described above are only illustrative. For example, the division of the units is only a logical function division. In actual implementation, there may be other division methods. For example, multiple units or components may be combined or may be integrated into another system, or some features may be ignored, or not implemented. In addition, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units may be selected according to actual needs to achieve the purpose of the solutions of the embodiments.

In addition, each functional unit in each embodiment of the present disclosure may be integrated into one processing unit, each unit may exist separately and physically, or two or more units may be integrated into one unit. The above-mentioned integrated units may be implemented in the form of hardware or in the form of software functional units.

The integrated unit may be stored in a computer readable storage medium if it is realized in a form of software functional unit and sold or used as a separate product. Based on this understanding, the technical solutions of the present disclosure, in essence, or the part contributing to the related art, or the part of the technical solution, may be embodied in a form of a software product. The computer software product is stored in a storage medium, including a number of instructions for causing a computer device (which may be a personal computer, a server, or a network device, or the like) to perform all or part of the acts of the methods described in various embodiments of the present disclosure. The aforementioned storage medium includes: various kinds of media that may store program codes, such as a USB flash drive, a removable hard disk, a ROM, a RAM, a magnetic disk, or an optical disc, etc.

The above-mentioned embodiments are only used to illustrate the technical solutions of the present disclosure, and are not intended to limit them. Although the present disclosure has been described in detail with reference to the foregoing embodiments, those skilled in the art should understand as follows. The technical solutions described in the aforementioned embodiments may still be modified, or some of the technical features may be equivalently replaced. Such modifications or substitutions do not make the essence of the corresponding technical solutions depart from the spirit and scope of the technical solutions of the various embodiments of the present disclosure.

What is claimed is:

1. An application starting method, applicable to an electronic device capable of running a first operating system and a second operating system, wherein the application starting method comprises:

in a case that a display screen of the electronic device is controlled by the first operating system, and in response to the second operating system detecting that a pre-starting condition is met, pre-starting one or more first applications in the second operating system by the second operating system; and in response to a first system switching instruction, switching to a case that the display screen is controlled by the second operating system, and controlling the display screen by the second operating system to display an interface related to a target application in the one or more pre-started first applications.

2. The application starting method according to claim 1, wherein pre-starting one or more first applications in the second operating system by the second operating system, comprises:

creating a first application process corresponding to each first application in the second operating system by the second operating system, and initializing each first application separately through a first initialization manner.

3. The application starting method according to claim 2, wherein after initializing each first application separately through the first initialization manner, the method comprises:

creating an interface related to each first application separately in each initialized first application process by the second operating system.

4. The application starting method according to claim 3, wherein creating the interface related to each first application separately in each initialized first application process by the second operating system, comprises:

creating a corresponding application component separately in each initialized first application process by the second operating system, and initializing a property of each application component through a second initialization manner to obtain the interface related to each first application.

5. The application starting method according to claim 2, wherein creating the first application process corresponding to each first application in the second operating system by the second operating system, comprises:

detecting by the second operating system whether the first application process corresponding to each first application to be started in the second operating system has been created; and in response to the first application process corresponding to any first application being not created, creating the first application process corresponding to the any first application by the second operating system.

6. The application starting method according to claim 1, wherein pre-starting one or more first applications in the second operating system by the second operating system, comprises:

obtaining a starting policy matching the pre-starting condition by the second operating system, and pre-starting one or more first applications in the second operating system according to the starting policy; wherein the starting policy is configured to indicate a progress of the pre-starting.

7. The application starting method according to claim 1, wherein before in response to the first system switching instruction, switching to the case that the display screen is controlled by the second operating system, the method further comprises:

in response to the first operating system detecting an application starting operation for the target application in the second operating system, generating the first system switching instruction; or in response to the first operating system detecting a screen-on operation, generating the first system switching instruction.

8. The application starting method according to claim 7, wherein after the controlling the display screen by the second operating system to display the interface related to the target application in the one or more pre-started first applications, the method further comprises:

in response to the second operating system not detecting the application starting operation for a second application within a specified time period, closing the pre-started second application; wherein the second application is an application other than the target application among the one or more first applications.

9. The application starting method according to claim 1, wherein before in response to the second operating system detecting that the pre-starting condition is met, pre-starting one or more first applications in the second operating system by the second operating system, the method further comprises:

in a case that the display screen of the electronic device is controlled by the first operating system, obtaining the pre-starting condition corresponding to a user by the second operating system and one or more first applications to be started in the second operating system corresponding to the pre-starting condition; wherein the pre-starting condition comprises a time condition and/or a scene condition.

10. The application starting method according to claim 9, wherein the pre-starting condition corresponding to the user and the one or more first applications to be started in the second operating system corresponding to the pre-starting condition are pre-built by the second operating system based on a user's application usage record within a specified time period.

11. The application starting method according to claim 9, wherein obtaining the pre-starting condition corresponding to the user by the second operating system and one or more first applications to be started in the second operating system corresponding to the pre-starting condition, comprises:

obtaining user identity information by the second operating system, and obtaining the pre-starting condition corresponding to the user and the one or more first applications to be started in the second operating system corresponding to the pre-starting condition based on the user identity information.

12. The application starting method according to claim 9, wherein after the pre-starting one or more first applications in the second operating system by the second operating system, the method further comprises:

in response to the first operating system detecting a start instruction for a second application in the second operating system, switching to a case that the display screen is controlled by the second operating system, and controlling the display screen by the second operating system to display an interface related to the second application; wherein the second application is an application other than the first application in the second operating system; and updating the pre-starting condition corresponding to the user and the one or more first applications to be started in the second operating system corresponding to the pre-starting condition by second operating system based on a usage record of the second application.

13. The application starting method according to claim 1, wherein the electronic device comprises two processors, one of the two processors is configured to run the first operating system, and the other of the two processors is configured to run the second operating system.

14. The application starting method according to claim 1, wherein the electronic device comprises a dual-core processor, one core of the processor is configured to run the first operating system, and the other core of the processor is configured to run the second operating system.

15. An electronic device, comprising:

a memory storing executable program codes; and a processor and a display screen both coupled to the memory;

wherein the processor is configured to invoke the executable program codes stored in the memory; in response to the executable program codes being executed by the processor, the processor and the display screen perform:

in a case that a display screen of the electronic device is controlled by a first operating system of the electronic device, and in response to a second operating system of the electronic device detecting that a pre-starting condition is met, pre-starting one or more first applications in the second operating system by the second operating system; and in response to a first system switching instruction, switching to a case that the display screen is controlled by the second operating system, and controlling the display screen by the second operating system to display an interface related to a target application in the one or more pre-started first applications.

16. A non-transitory computer-readable storage medium, storing a computer program, wherein in response to the computer program being executed by a processor, the processor is enabled to perform:

in a case that a display screen of an electronic device is controlled by a first operating system of the electronic device, and in response to a second operating system of the electronic device detecting that a pre-starting condition is met, pre-starting one or more first applications in the second operating system by the second operating system; and in response to a first system switching instruction, switching to a case that the display screen is controlled by the second operating system, and controlling the display screen by the second operating system to display an interface related to a target application in the one or more pre-started first applications.

17. The electronic device according to claim 15, wherein pre-starting one or more first applications in the second operating system by the second operating system, comprises:

creating a first application process corresponding to each first application in the second operating system by the second operating system, and initializing each first application separately through a first initialization manner.

18. The electronic device according to claim 17, wherein after initializing each first application separately through the first initialization manner, the method comprises:

creating an interface related to each first application separately in each initialized first application process by the second operating system.

19. The non-transitory computer-readable storage medium according to claim 16, wherein before in response to the second operating system detecting that the pre-starting condition is met, pre-starting one or more first applications in the second operating system by the second operating system, the method further comprises:

in a case that the display screen of the electronic device is controlled by the first operating system, obtaining the pre-starting condition corresponding to a user by the second operating system and one or more first applications to be started in the second operating system corresponding to the pre-starting condition; wherein the pre-starting condition comprises a time condition and/or a scene condition.

20. The non-transitory computer-readable storage medium according to claim 19, wherein the pre-starting condition corresponding to the user and the one or more first applications to be started in the second operating system corresponding to the pre-starting condition are pre-built by the second operating system based on a user's application usage record within a specified time period.

* * * * *